United States Patent [19]

Menzi

[11] Patent Number: 5,771,743
[45] Date of Patent: Jun. 30, 1998

[54] CONTINUOUSLY VARIABLE TORQUE TRANSMISSION WITH TORSION BARS AND ENERGY RECUPERATING BRAKE DEVICE

[75] Inventor: Ulrich Menzi, Rue des Noyers 27, CH-2003 Neuchatel, Switzerland

[73] Assignee: Ulrich Menzi, Neuchatel, Switzerland

[21] Appl. No.: 532,247

[22] Filed: Sep. 22, 1995

[30] Foreign Application Priority Data

Apr. 13, 1995 [CH] Switzerland ................... 01076/95

[51] Int. Cl.⁶ .................................................. F16H 29/00
[52] U.S. Cl. .............................. 74/116; 74/119; 74/125.5; 74/123
[58] Field of Search ............................ 74/116, 117, 119, 74/122, 123, 125.5

[56] References Cited

U.S. PATENT DOCUMENTS

| | | | |
|---|---|---|---|
| 3,340,743 | 9/1967 | Stageberg | 74/116 |
| 4,091,684 | 5/1978 | Lehmann | 74/116 |
| 4,112,778 | 9/1978 | Korosue | 74/117 |
| 4,242,050 | 12/1980 | Oakes | 74/116 |

*Primary Examiner*—Rodney H. Bonck
*Assistant Examiner*—David M. Fenstermacher
*Attorney, Agent, or Firm*—Banner & Witcoff, Ltd.

[57] ABSTRACT

A mechanical continuously variable torque transmission, in particular for flywheel driven, fuel efficient, low emission cars, trucks and locomotives includes structure as follows: three eccentrics 20, 21, 22, mounted on input shaft 18 and carrying needle bearings 23, 24, 25, rotate freely inside three loops of flexible bands 57, 58, 59. One end of each flexible bands is mounted on an oscillating member 36, 37 or 38, which contain overrunning clutches, able to drive output shaft 30. The oscillating members 36, 37, 38 are each held in a home position by a spring 63 and stop 60, 42. The other ends of the flexible bands are each mounted on a pulley 49, 50, or 51, which are themselves mounted on torsion bars 71, 72, 73. The torsion bars are adjustable in angular position as well as in their elastic length.

Rotation of pulleys 49, 50, 51 tightens the flexible bands so that rotation of the eccentrics causes torque to the oscillating members and pulleys in the first half of a cycle of rotation of each eccentric. The level of torque is adjustable by changing the elastic length of the torsion bars. The torques exerted on the oscillating members 36 are transmitted through overrunning clutches 39 to the output shaft 30. In a second half of a cycle of rotation of each eccentric, the energy stored in the torsion bars flows back to the input shaft 18.

13 Claims, 5 Drawing Sheets

DETAIL F

DETAIL G

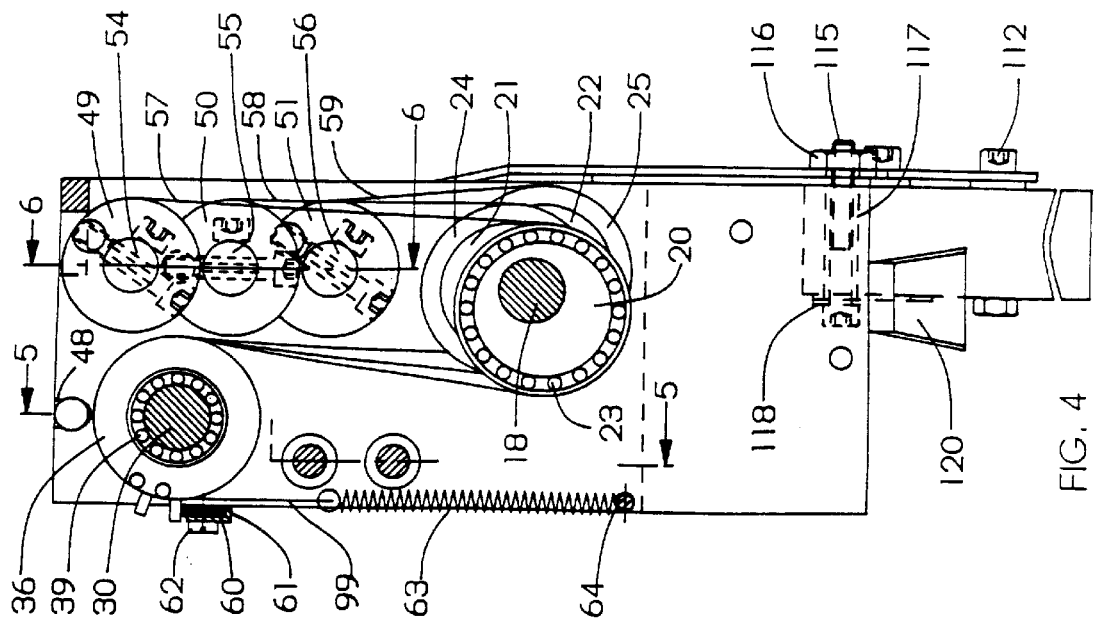

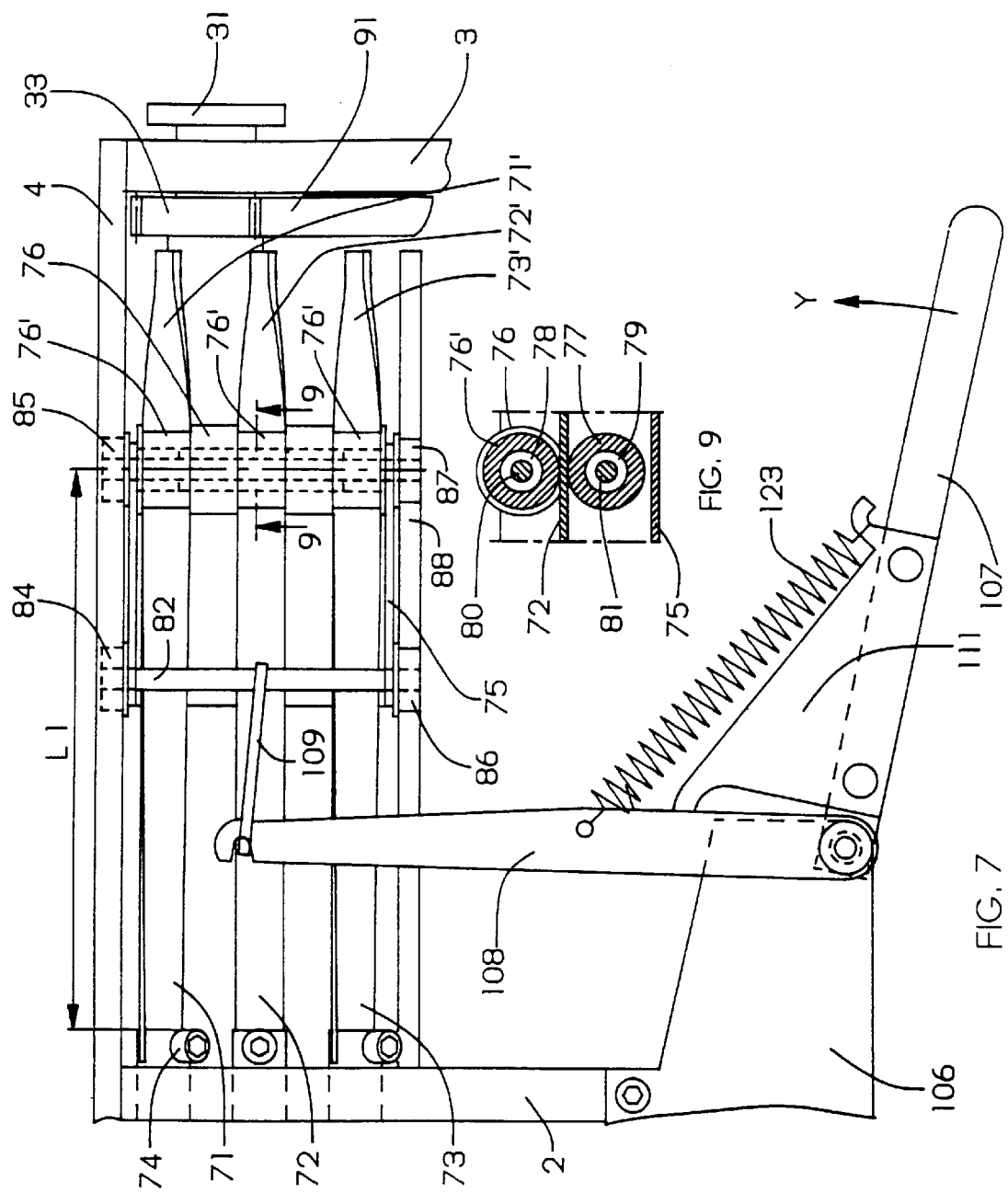

5,771,743

CONTINUOUSLY VARIABLE TORQUE TRANSMISSION WITH TORSION BARS AND ENERGY RECUPERATING BRAKE DEVICE

BACKGROUND OF THE INVENTION

The present invention relates generally to torque converters, and more particularly relates to continuously variable transmissions (CVT) which may be defined as devices used to transmit power or energy by changing level of torque. At present, fluid torque converters combined with planetary automatic shift provide a reliable but expensive solution with loss of efficiency especially during shifting. They are not convenient for non variable drive speed as it occurs in flywheel drives.

SUMMARY OF THE INVENTION

The purpose of the present invention is to provide a continuously variable torque transmission with the advantages of automatic transmissions without the need for planetary automatic shifting. A given torque is provided by a flywheel or another constant speed rotating drive. The torque is converted from zero to a maximum torque in order to reach and hold a cruising speed of a vehicle. The torque is continuously variable as supplied by the transmission.

The variable torque transmission of the invention is preferably used in conjunction with an energy recuperating brake device, consisting of an energy accumulating spring, which releases energy periodically to the drive shaft.

Another object of the present invention is to provide a variable torque transmission which requires only a single control lever to control neutral, acceleration, cruising and braking actions.

A transmission according to the invention uses torsion bars which are adjustable in angular position as well as in their elastic length to allow direct control of transmitted torque. This arrangement may contribute to the development of future flywheel driven, fuel efficient, low emission cars, trucks and locomotives.

BRIEF DESCRIPTION OF THE DRAWINGS

FIG. 4 shows a cross-section taken at line 4—4 of FIG. 1 (transmission in working condition).

FIG. 5 shows a cross-section taken at line 5—5 of FIG. 4.

FIG. 6 shows a cross-section taken at line 6—6 of FIG. 4.

FIG. 7 shows a partial top view (for minimal torque).

FIG. 9 shows a cross-section taken at line 9—9 of FIG. 7.

Figure 1:
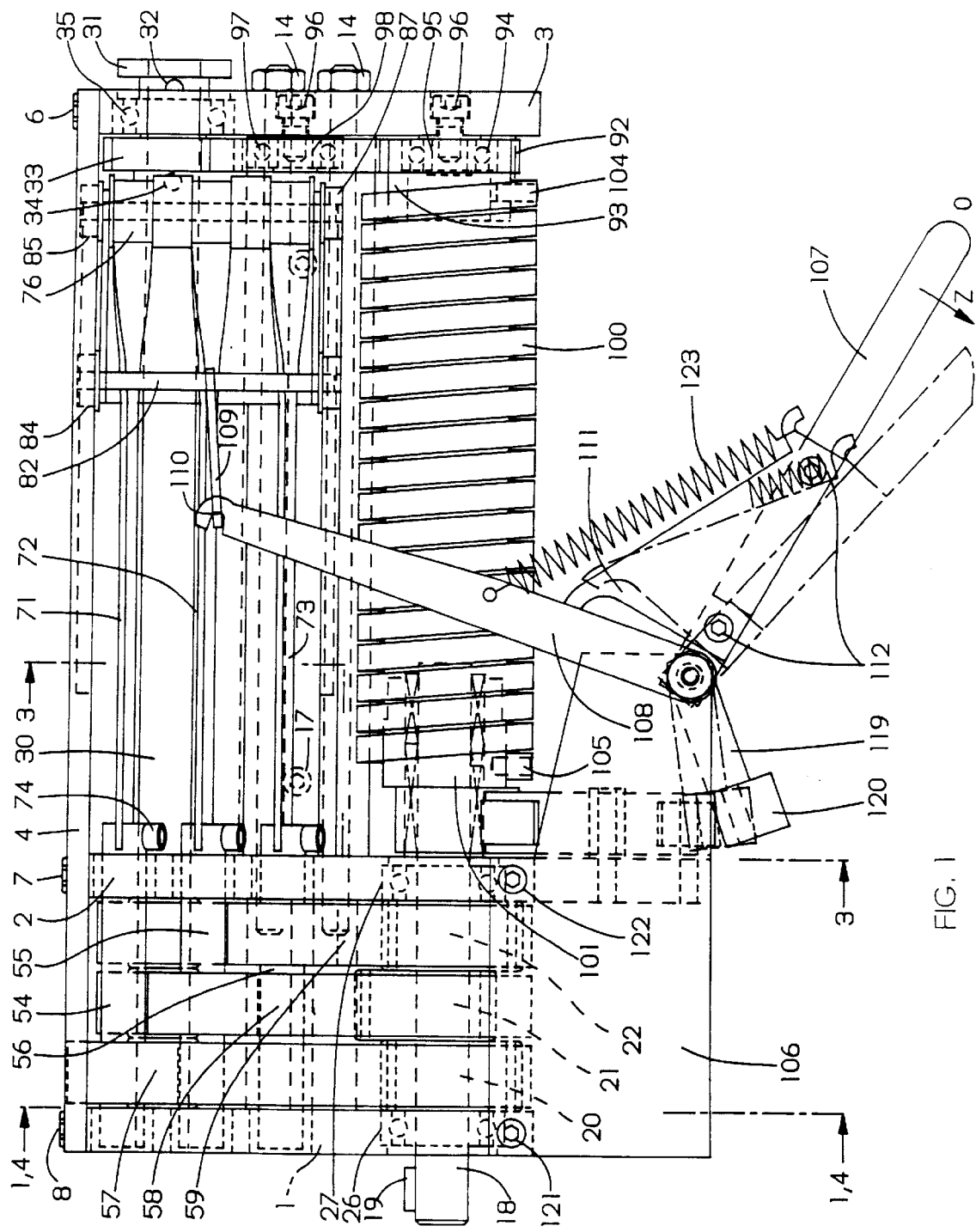
FIG. 1 shows a top view of the preferred embodiment of the variable torque transmission of the invention.

Detail F shows a detail of connection of representative band 57 to representative pulley 49.

Detail G shows a detail of connection of representative band 57 and representative band 99 to representative oscillating member 36.

DETAILED DESCRIPTION OF THE PREFERRED EMBODIMENT

Referring to the drawing, the transmission of the preferred embodiment contains a structure consisting of plates 1, 2, 3, struts 4, 9, 10 and the connecting bolts and screws 11, 12, 13, 14, 6, 7, 8.

An input shaft 18 is mounted in bearings 26, 27 and contains a key 19. Three equa-angularly spaced eccentrics 20, 21, 22 (FIGS. 1, 2 and 4) are mounted on the input shaft 18. Needle bearings 23, 24, 25 (FIGS. 2 and 4) idle on the eccentrics 20, 21, 22.

An output shaft 30 is mounted in needle bearings 28, 29 and ball bearing 35. Fastened on the output shaft 30 is a hub 31 with pin 32 and a pinion 33 with pin 34.

Oscillating members 36, 37, 38 (FIG. 5) are mounted on the output shaft 30. The oscillating members 36, 37, 38 contain overrunning clutches 39, 40, 41, which close in direction T.

Figure 8:
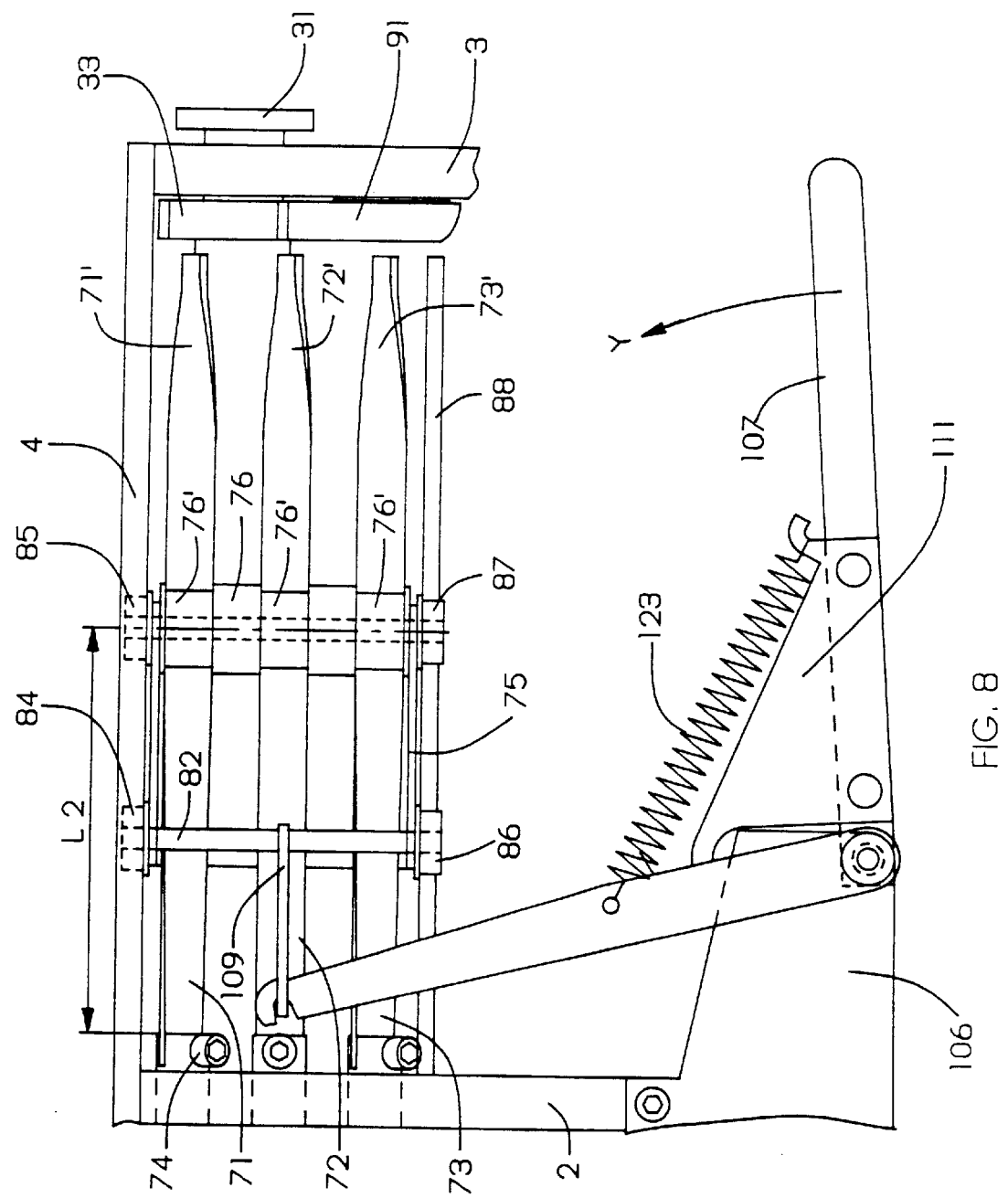
FIG. 8 shows a partial top view (for maximal torque).

Three pulleys 49, 50, 51 (FIGS. 2, 4, 6) are mounted on corresponding shafts 54, 55, 56, which pivot in needle bearings 65, 66, 67, 68, 69, 70. The shafts 54, 55, 56 contain slots 54', 55', 56' (FIG. 6) in which torsion bars 71, 72, 73 are engaged. The torsion bars are held in place with screws 74. The other ends of the torsion bars contain counterclockwise twisted sections 71', 72', 73' (FIGS. 7, 8).

Flexible bands 57, 58, 59 (FIGS. 1, 2, 3, 4) are fastened with bolts 52 and screws 53 to the pulleys 49, 50, 51. From there the flexible bands 57, 58, 59 embrace the needle bearings 23, 24, 25 on the eccentrics 20, 21, 22 (FIG. 4, Detail G) and end on the oscillating members 36, 37, 38, fastened with pins 43. Also fastened to the oscillating members 36, 37, 38 are homing bands 99 (FIGS. 2, 4) with pins 44. Springs 63 are hooked on homing bands and pin 64 to hold the oscillating members 36, 37, 38, with pressed in stud 42, against stop 60 in home position. Stop 60 is screwed under angle 61 on plates 1 and 2 with screws 62.

Figure 3:
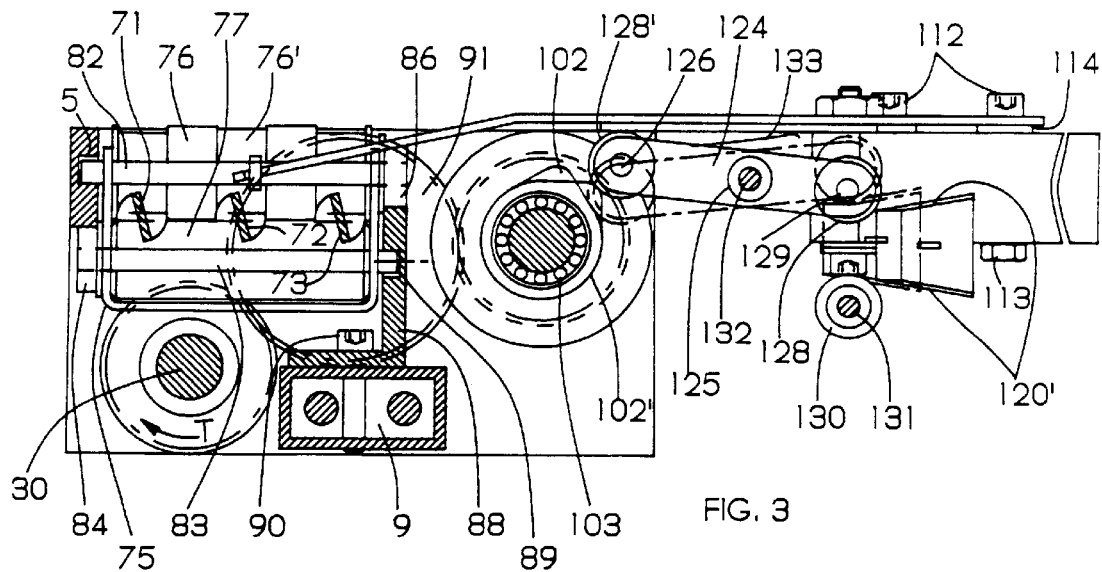
FIG. 3 shows a cross-section taken at line 3—3 of FIG. 1.

A carriage 75 (FIGS. 3, 7, 8) contains pins 80 and 81 around which idle a pair of rolls 76 and 77 on needle bearings 78 and 79. Three grooves 76', closed by roll 77, hold the torsion bars 71, 72, 73 laterally. Rail 88 is screwed on strut 9 with screws 17 and 90. Rollers 86 and 87 turn free on pins 80 and 82 and roll on rail 88. Two other rollers 84 and 85 turn free on pins 81 and 83 and roll on a rail 4. The ends of pins 80 and 82 which do not carry rollers are engaged in slot 5 of rail 4 and those of pins 81 and 83 are engaged in slot 89 of rail 88 (FIG. 3). The engagement of pins 80 and 82 in slot 5 and pins 81 and 83 in slot 89 prevents the carriage from falling out. 11

Drawbar 109 links the carriage 75 with lever 108, which is pulled toward stop 111 with springs 123. Stop 111, washers 114, control lever 107 and angle 119 are screwed together with screws 112 and nuts 113 to form a lever system 107', which pivots on sleeve 117 and shoulder nut 116. Sleeve 117 is screwed on plate 106 with screw 115, washer 118 and shoulder nut 116. Plate 106 is screwed on plates 1 and 2 with screws 121 and 122. A rubber key 120 encloses angle 119. Lever 124 pivoting with bearing 125 on pin 132, is held in home position by flat spring 133 and contains two rollers 128 and 128' which rotate free on pins 129 and 126. Roller 130 idles on pin 131 which is pressed in plate 2 the same way as pin 132.

Pinion 33 is engaged with gear 91 (FIG. 3). Gear 91 idles on bearing 97. Bearing 97 is fixed to plate 3 with screw 96 and shoulder nut 98. Fixed in the same manner to plate 3 is gear 92 with bearing 94, screw 96 and shoulder nut 95. Gear 92 contains a hub 93 on which is fixed a torsion spring 100 by pin 104 (FIG. 1). The other end of torsion spring 100 is fixed to hub 101 by pin 105. Hub 101 contains an overrunning clutch which closes in the direction of arrow S (FIG. 2) to drive input shaft 18. Hub 101 also contains a cam 102.

Figure 2:
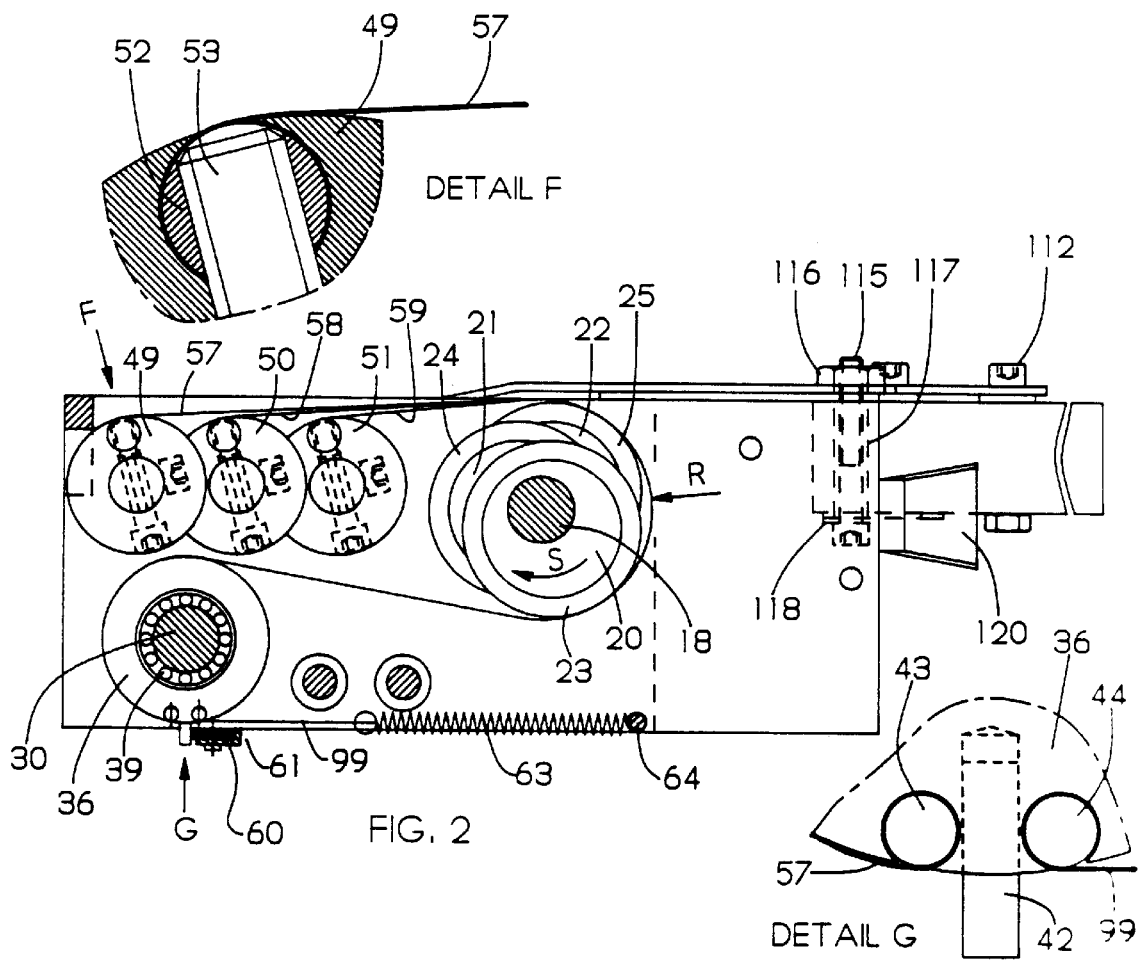
FIG. 2 shows a cross-section taken at line 1—1 of FIG. 1 (transmission in neutral position).

Referring to FIGS. 1 and 2, control lever 107, in neutral position 0, places the pair of rolls 76, 77 at the beginning of twisted sections 71', 72', 73' of the torsion bars 71, 72, 73 such that the pulleys 49, 50, 51 unwind enough flexible band 57, 58, 59, to form a loop with radius R to give way to the rotating eccentrics 20, 21, 22 and their appertaining needle bearings.

Referring to FIGS. 7 and 4, when control lever 107 is pushed in direction Y, carriage 75 moves to the left. At distance l1, the pair of rolls 76, 77 is situated at the end of the twisted sections 71', 72', 73', and the pulleys 49, 50, 51 turn counterclockwise to wind up just as much flexible band as needed to be stretched in the nearest position of the eccentrics as it is the case for eccentric 21 in FIG. 4, without lifting of pin 42 from stop 60.

On the first half of a revolution, eccentric 21 moves the double amount of its eccentricity to the right and is pulling four times as much flexible band. Needle bearing 24 prevents friction between eccentric 21 and flexible band 58. When output shaft 30 is substantially loaded (drive up), the tension in the flexible band causes mainly clockwise rotation of pulley 50 and therefore twists torsion bar 72. The same amount of torque, created by torsion bar 72, is also applied on the oscillating member 37 and overrunning clutch 40, which is closing in the direction of arrow T and driving output shaft 30. During the second half revolution of the eccentrics, which is the case of eccentric 20 in FIG. 4, the energy which is stored in the torsion bars flows back to input shaft 18 through flexible band 57 and eccentric 20. Springs 63 pull back oscillating member 37 to stop 60 through band 99, to be ready for the next cycle.

As shown in FIG. 8, to increase the transmissible torque, the elastic length L of torsion bars 71, 72, 73 is reduced by pulling the carriage 75 farther to the left with control lever 107. Rollers 86, 87 and 84, 85 help reduce the force to control the torque level. At length L2, the transmissible torque is at a maximum.

To brake the output shaft 30 with energy recuperating effect, control lever 107 is pulled in direction Z, as referenced in FIG. 1. As carriage 75, in neutral position, stops at the end of slot 5, lever 108 remains in place so that only lever system 107 pivots and places rubber key 120 between roll 128 and 130 to pivot lever 124 counterclockwise until roll 128' hits feet radius 102' of cam 102.

Output shaft 30 drives, through pinion 33, gear 91, and 92, the torsion spring 100 which turns together with connected cam 102 in the same direction but slower as input shaft 18. When the ascendent curb of cam 102 touches roll 128', torsion spring 100 starts to accumulate energy until the growing torque is big enough to overcome the resistance of rubber key 120 through compression. The energy of one spring revolution is now released and given back to input shaft 18 through overrunning clutch 103.

To increase the brake torque, control lever 107 is pushed further in direction Z to increase the thickness of rubber key 120'.

Overrunning clutch 46 which is rigidly mounted on plate 2 with hub 45 and stud 47 prevents output shaft 30 from rotating in the wrong direction.

I claim:

1. A mechanical transmission comprising:
   a rotatable input shaft;
   a rotatable output shaft;
   eccentrics mounted on the input shaft for rotation with the input shaft;
   oscillating members and overrunning clutches mounted on the output shaft for rotating the output shaft in a driving direction of oscillation of the oscillating members;
   flexible traction means for transmitting motion from the eccentrics to the oscillating members, the flexible traction means connected to the oscillating members and encircling the eccentrics, the flexible traction means including elastic members which are adjustable in elasticity to vary torque in the output shaft and movable to move the oscillating members in the driving direction; and
   a stop and springs, the springs pulling the flexible traction means against the stop;
   wherein the flexible traction means includes members chosen from among the group comprising bands, tooth belts and cables;
   further comprising a movable control lever connected to the elastic members for adjusting the elasticity of the elastic members by adjusting the length of the elastic members, wherein a neutral position of the control lever corresponds to a position of the flexible traction means in which the eccentrics rotate freely without effect on the flexible traction means;
   whereby neutral position of the control lever results in no movement of the output shaft;
   and wherein the elastic members are torsion bars with twisted ends.

2. A mechanical transmission comprising:
   a rotatable input shaft;
   a rotatable output shaft;
   eccentrics mounted on the input shaft for rotation with the input shaft;
   oscillating members and overrunning clutches mounted on the output shaft for rotating the output shaft in a driving direction of oscillation of the oscillating members;
   flexible traction means for transmitting motion from the eccentrics to the oscillating members, the flexible traction means connected to the oscillating members and encircling the eccentrics, the flexible traction means including elastic members which are adjustable in elasticity to vary torque in the output shaft and movable to move the oscillating members in the driving direction; and
   a stop and springs, the springs pulling the flexible traction means against the stop,
   further comprising braking means for braking the output shaft comprising energy storage means and means to transmit energy from the output shaft to the input shaft;
   wherein the elastic members are torsion bars with twisted ends, the transmission further comprising a pair of rolls, one of which contains grooves to guide the torsion bars laterally, the torsion bars extending into the grooves.

3. The mechanical transmission of claim 2, the transmission further comprising a carriage movable along the length of the torsion bars, the rolls mounted on the carriage.

4. The mechanical transmission of claim 2, the flexible traction means including bands, the bands encircling the eccentrics, connected to the torsion bars, and connected to the oscillating members, the twisted ends of the torsion bars extending into the grooves, the rolls displacable along the length of the twisted ends of the torsion bars to a position L1, wherein the torsion of the torsion bars causes the bands to snugly encircle the eccentrics without causing movement of the oscillating members, when the eccentrics are in positions of least tension on the bands.

5. A mechanical transmission comprising:

a frame;

a rotatable input shaft mounted on the frame for rotation relative to the frame;

a rotatable output shaft mounted on the frame for rotation relative to the frame;

eccentrics mounted on the input shaft for rotation with the input shaft;

oscillating members mounted on the output shaft for rotating the output shaft in a driving direction of oscillation of the oscillating members;

pulleys mounted on the frame for rotation relative to the frame;

bands connected to the oscillating members and pulleys, and encircling the eccentrics; torsion bars connected to the pulleys;

whereby rotation of the input shaft rotates the eccentrics, the rotation of the eccentrics thereby moving the bands, the movement of the bands pivoting the pulleys and the oscillating members, the torque in the torsion bars creating corresponding torque in the output shaft, and the pivoting of the oscillating members driving the output shaft.

6. A mechanical transmission as in claim 5, further comprising bearings, the bearings being mounted on the eccentrics and the bands encircling the bearings, whereby the bearings are rotatable relative to the input shaft and movement of the input shaft causes linear and generally non-rotational movement of the bands.

7. A mechanical transmission as in claim 5, further comprising overrunning clutches between the oscillating members and output shaft, for causing the oscillating members to drive the output shaft in one direction of rotation of the output shaft.

8. A mechanical transmission as in claim 5, further comprising means for varying the effectiveness of the torsion bars, whereby the torque in the torsion bars is variable.

9. A mechanical transmission as in claim 5, further comprising a carriage mounted to move relative to the frame and interconnected with the torsion bars to vary the elastic length of the torsion bars, whereby the torque in the torsion bars is variable by movement of the carriage.

10. A mechanical transmission as in claim 9, the carriage including rollers between which the torsion bars pass, the torsion bars including twisted sections, and the interaction of the twisted sections and the rollers as the carriage is moved relative to the torsion bars varying the effective length of the torsion bars.

11. A mechanical transmission as in claim 10, further comprising a control lever attached to the carriage by which the carriage is movable.

12. A mechanical transmission as in claim 5, the eccentrics, oscillating members, pulleys, bands and torsion numbers all being three in members, the eccentrics being substantially equa-angularly spaced about the input shaft.

13. A mechanical transmission as in claim 5, further comprising an energy storage spring, the output shaft mechanically connected to the energy storage spring during braking of the output shaft for tensioning the energy storage spring, and the energy storage spring mechanically connected to the input shaft for driving the input shaft and any connected power source from the energy stored in the spring by said tensioning.

* * * * *